UNITED STATES PATENT OFFICE 2,670,344

SEPARATION OF HYDROCARBONS WITH THIOUREA

Lloyd C. Fetterly, El Cerrito, Calif., asssignor to Shell Development Company, Emeryville, Calif., a corporation of Delaware No Drawing. Application December 18, 1950, Serial No. 201,490

1 Claim. (Cl. 260—96.5)

This invention relates to a process for the extractive fractionation of hydrocarbons. More particularly, it relates to improvements in the process of fractionally separating hydrocarbons from mixtures thereof by the use of thiourea.

The fractionation of mixtures of organic compounds presents complex problems, both technical and economic. For example, the separation of mixtures of closely allied isomers, such as octane from mixtures thereof with iso-octane, is difficult by any of the usual and economic procedures, such as fractional distillation. Further, the efficiency of conversion procedures such as alkylation, isomerization and cyclization, is reduced if feed stocks are not of the correct composition.

In most of such conversion reactions an equilibrium mixture is generally obtained comprising fixed ratios of unconverted feed stock and the desired product. If the feed stock initially contains some of the conversion product, such as from a previous cycle through the converter, the amount of conversion is correspondingly reduced.

The two principal means for fractionation of such mixtures on a commercial scale have been fractional distillation and solvent extraction. Recently, however, a new method has been shown to be suitable for large scale separations, namely extractive crystallization with urea. It was found that urea forms crystalline complexes with organic compounds of substantially straight chain structure. The complexes so formed are of indeterminate structure, but appear to be unstable molecular complexes rather than true chemical reaction products. This is indicated by their unstable character and the consequent ease of the regeneration of their components, namely urea and the unaltered organic compound.

When thiourea is the complex-forming agent employed, the complexes formed thereby are usually of a substantially different character in that thiourea forms complexes with organic compounds having either a branched configuration or a cycloaliphatic (alicyclic) structure.

Mixtures of these complex-forming agents can be employed to extract normal and branched non-aromatic compounds as well as naphthenes from mixtures containing other types of compounds usually in excess. This latter process is advantageously employed for the purification of aromatics such as benzene, toluene, etc.

These processes are particularly applicable to the refinement of petroleum or other hydrocarbon mixtures, especially those of straight chain structure (which may be suitably fractionated by complex formation with urea), or hydrocarbons of branched chain or alicyclic structure (which readily form complexes with thiourea). The general procedure known to the prior art as far as urea is concerned comprised treatment of such mixtures with a solution of the complex-forming agent. Under these circumstances a mixture of complexes usually was formed. This was due to the characteristics of the complex-forming agent whereby under a given set of operating conditions certain classes of compounds formed complexes with the agent present. Thus, if both isoparaffins and naphthenes were present in a mixture of hydrocarbons, the treatment of such a mixture with thiourea would result in the formation of complexes of both of these types of hydrocarbons with thiourea. For many purposes the presence of one or another type of compound in admixture with other types is undesirable. If, for example, this process were being used for the preparation of high octane gasoline, the presence of naphthenes in the product would be undesirable. Therefore, an improvement upon the known process would comprise a revision thereof whereby the final product substantially excluded naphthenes and largely comprised isoparaffins.

In a number of instances a mixture of organic compounds contains a relatively minor fraction of material which will form crystalline complexes with one of the above agents. It has been noted that if only a minor amount of complexes are formed and thereafter separated from a liquid mixture by filtration the thin layer of crystals tends to clog the filter cloth and thus to reduce the efficiency of the filtration step.

It is an object of this invention to improve selective fractionation processes, particularly those wherein the complex-forming agent is thiourea. It is another object of this invention to provide a process whereby the necessity of conducting complex formation in the presence of a separate liquid phase is no longer necessary. It is a further object of this invention to provide a process of selective fractionation wherein solvents for both the hydrocarbons to be fractionated and for the complex-forming agent are no longer required. It is another object of this invention to provide for the efficient fractionation of certain hydrocarbon mixtures while they are in a vaporized state. Other objects will become apparent during the following discussion.

Now in accordance with this invention, it has been found that complexes may be formed between thiourea and certain vaporized or gaseous hydrocarbons, especially those having less than 10 carbon atoms. Still in accordance with this invention, it has been found that mixtures of hydrocarbons preferably those having 7 or less carbon atoms may be fractionated by complex formation with either urea or thiourea in the absence of any solvents for the latter two agents or present as a separate liquid phase. Again in accordance with this invention it has been found that the fractionation of a mixture of hydrocarbons may be efficiently carried out by passing vaporized mixtures thereof over comminuted thiourea. Still in accordance with this invention, it has been discovered that the complex-forming agent may be deposited on the surface of a substantially inert carrier in order to promote rapid complex formation thereof with a reactive organic compound.

In carrying out the process of the present invention a preferred system comprises passing the vaporized mixture hydrocarbons through a complex-forming zone, whereby a fraction of the mixture forms complexes with the agent present in said zone. Upon formation of such complexes, crystals thereof separate and remain in the zone while the remaining gaseous or vaporized compounds of the original mixture pass out of the zone and thereby are separated from the agent and the complexes just formed. A particular embodiment of this invention comprises passing a mixture of vaporized hydrocarbons to be separated through a column partially filled with powdered thiourea or contacting said gaseous mixture with solid thiourea. As the vaporized mixture passes through the bed of the complex-forming agent, or in contact with said agent, complexes are formed between the agent and a fraction of the vaporized material. These complexes remain as solid material while the remaining gaseous material passes out of the tower. At suitable intervals the introduction of the material to be fractionated may be stopped and the solid complexes are subjected to regeneration procedures whereby the agent and the hydrocarbons associated therewith are reformed by destruction of the solid crystalline complexes. Preferred methods of regeneration are discussed hereinafter.

Alternative means may be employed for the formation of complexes between vaporized hydrocarbons and thiourea, such as passing the vaporized mixture through a solution of the agent or through a bed of the agent wherein the latter is deposited in film or other solid condition on the surface of a substantially inert carrier. Suitable solvents for thiourea include water and the lower alcohols such as methyl alcohol as well as the lower aliphatic ketones, aldehydes, acids having less than 7 carbon atoms such as methyl ethyl ketone, methyl isobutyl ketone, butyraldehyde, etc. Suitable carriers for the complex-forming agent include alumina, silica, clay, carbon and mineral aggregates.

The use of solid thiourea is a preferred method of carrying out the present invention. When the vaporized hydrocarbons are contacted with the complex-forming agent under these conditions with solvents, the regeneration procedures are simplified. Furthermore, in the absence of solvents as a separate liquid phase (other than present in a wetted complex-forming agent) for the complex-forming agent the maximum amount of complexes will be formed, since the equilibrium of the complex-forming reaction is thereby favored. If solutions of the agent are employed they must be kept at saturated or supersaturated condition at all times if the maximum complex formation is desired.

An advantage of the process according to the present invention is that the troublesome problem of occlusion of contaminating liquid material on the thiourea complexes is greatly alleviated. Due to the relatively large size and nature of the thiourea complexes they tend to absorb and adsorb a considerable amount of a non-complex-forming liquid when in contact with such a liquid phase. However when these complexes are in contact with vaporized non-complex-forming organic materials the amount or weight of this material associated (absorbed and/or adsorbed) with thiourea complexes in a fractionating process is considerably reduced.

An additional advantage of the process according to the present invention comprises inclusion of a selective fractionation tower in the usual fractionation apparatus as currently employed in petroleum refineries. The fractionation process may be conducted by using the complex-forming agent in solid comminuted form in apparatus similar to that used for the catalytic conversion of petroleum fractions wherein a fluidized catalyst is employed or in an apparatus similar to that used for the separation of various gaseous hydrocarbons via the so-called Hypersorption process.

A feature of this invention is that the rate of complex formation between the various hydrocarbons and thiourea is greatly increased when the solid urea or solid thiourea is wetted with a promoter. The promoter is present on the solid complex-forming agent as a liquid film and promotes a more intimate contact between thiourea and hydrocarbons forming complexes therewith. The promoters which have been found to be most effective are usually normally liquid organic compounds and preferably are a solvent for both the complex-forming agent and the hydrocarbons forming a complex therewith. The choice of promoter is influenced to some extent by the conditions under which complex formation takes place, e. g. when complex formation takes place at a relatively elevated temperature it is desirable to employ therewith a promoter whose vapor pressure at that temperature and under the conditions of contacting is not excessive, i. e. whose boiling point under the conditions of contacting has not been reached. A relatively high boiling semi-polar organic compound is preferred as a promoter since separation of the complex-forming organic compound therefrom may readily be made by distillation. The following organic compounds have been found to be suitable as promoters, methyl isobutyl ketone, methyl isopropyl ketone, isopropyl ketone, methyl ethyl ketone, mesityl oxide, sec-butyl alcohol, isoamyl alcohol, 2-ethyl-n-hexanol, isoamyl acetate, octanol, methyl alcohol, acetone, ethyl alcohol, tert-butyl alcohol, ethyl ketone. In general those aliphatic preferably oxygen containing polar organic compounds such as alkanones, alkenones and alkanols having 10 or less carbon atoms, particularly those having from 1 to 6 carbon atoms, are satisfactory.

Organic compounds especially hydrocarbons, which form complexes with thiourea are those having a predominating member which is a substantially branched radical or naphthene radical, such as alkaryl hydrocarbons wherein at least one alkyl group is an isoparaffin radical of about four or more carbon atoms. In general the alicyclic and non-straight-chain aliphatic hydrocarbons form solid complexes with thiourea.

Isoparaffins which form complexes with thiourea include isobutane, isopentane, 2,3-dimethylbutane, 1,1-dimethylpentane, 3-ethylpentane, 4-methyloctane, 2,4,4-trimethylhexane, 3,6-diethyloctane, etc. as well as their non-straight-chain aliphatic isomers and higher molecular weight homologues.

As stated hereinbefore, other hydrocarbons which readily form complexes with thiourea are the alicyclic organic compounds particularly the naphthenic hydrocarbons. Typical species of this group include cyclopropane, 1,1-dimethylcyclopropane, cyclobutane, cyclopentane, 1,1,3-trimethylcyclopentane, cyclohexane, 1,2,3-trimethylcyclohexane, pentamethylcyclohexane, triisopropylcyclohexane, etc. as well as their various alicyclic isomers and higher molecular weight homologues.

Each specific compound appears to react with thiourea at a certain rate under a given set of conditions. Hence, advantage may be taken of this phenomenon in effecting separations between two or more closely allied constituents of a mixture all of which constituents form complexes with thiourea.

The ratio of the complex-forming agent to active hydrocarbons will vary with the type of mixture to be treated and with the conditions of complex formation.

The formation and separation of the complexes having been accomplished as described hereinbefore, there remains the step of decomposing the complexes in order to recover the active, now separated, hydrocarbons present therein. While a number of methods have been found for effecting such a decomposition or regeneration, the following methods have been found to be the most satisfactory for use when carrying out the process of the present invention:

A. Heating.
B. Application of a solvent for the complex-forming agent.
C. Application of a solvent for a particular fraction of the regenerated hydrocarbons.

The complexes, as has been pointed out hereinbefore, are relatively unstable formations which appear to be loose combinations involving hydrogen bonding or some form of molecular attraction, the exact nature of which has not been completely defined. It has been found that due to their unstable character, splitting into the component parts of the complex may be readily accomplished, the complex-forming agent and the hydrocarbons in complex combination therewith being separately recovered in their original state.

By subjecting the complexes to heating simultaneous destruction of the complex and fractionation of the organic compounds regenerated therefrom may be accomplished. The heating may take place under normal or reduced pressures and the temperature and pressure may be so adjusted that the complexes are readily destroyed and the compounds regenerated therefrom are distilled into fractions which can be utilized for the purposes considered herein.

A further type of regeneration comprises addition of a solvent for the complex-forming agent, such as water or alcohol, to the complex and the application of heat to facilitate the regeneration. By this means the regenerated hydrocarbons separate from the solution of the complex-forming agent and subsequently may be separated and fractionated by normal purification or fractionation procedures.

A more preferred type of regeneration comprises the addition of a solvent for one or more fractions of the hydrocarbons to be regenerated from the complexes. When such a mixture is heated the complex decomposes, thus regenerating the hydrocarbons and complex-forming agents and, in the presence of such a solvent, a solution of at least part of the regenerated hydrocarbons forms and may be readily separated from any insoluble fractions which are present. Hence, fractionation according to solubility may be readily accomplished.

Fractionation by simple heating is satisfactory for some purposes. Following the regeneration by such means it is usually necessary to purify or fractionate the regenerated compounds and the regenerated complex-forming agent for further use.

In each of these regeneration processes it is preferred practice to minimize the time of regeneration and to conduct the latter at favorably low temperatures especially if water is employed in the thiourea solvent in order to prevent hydrolysis of these materials. Temperatures below 85° C. are preferred.

This application is a continuation-in-part of my copending patent application Serial No. 764,555, filed July 29, 1947, now abandoned.

The following examples illustrate the process of the present invention.

*Example I*

A liquid mixture of equal volumes of cyclohexane (B. P. 80° C.) and 2,4-dimethyl pentane (B. P. 80° C.) was placed in a vessel (53% wt. cyclohexane) at normal room temperature (ca. 25° C.) and the vapors emanating therefrom were caused to contact powdered solid thiourea. After some time it was found that 45% of the hydrocarbon mixture had vaporized over to form a complex with the solid thiourea. Upon examination thereafter it was found that the remaining liquid mixture contained only approximately 35% by weight cyclohexane, representing a reduction in cyclohexane content of about 35%.

*Example II*

A liquid mixture of equal volumes of cyclohexane and 2,4-dimethyl pentane was heated and the vapors emanating therefrom were contacted with powdered solid thiourea, condensed and returned to the liquid mixture. After a short period of time the vapors emanating from the liquid mixture were reduced in cyclohexane content from about 53% by weight to approximately 43% by weight, the thiourea having preferentially formed a complex with vaporized cyclohexane over vaporized 2,4-dimethyl pentane.

I claim as my invention:

The process for the recovery of cyclohexane from a mixture thereof with at least another hydrocarbon normally associated therewith which comprises; vaporizing said mixture, contacting the vapors thereof with solid thiourea whereby a solid complex is formed between cyclohexane and solid thiourea and heating said solid complex to recover a gaseous product having an increased proportion of cyclohexane.

LLOYD C. FETTERLY.

(References on following page)

References Cited in the file of this patent

UNITED STATES PATENTS

| Number | Name | Date |
|---|---|---|
| 2,336,643 | Schulze | Dec. 14, 1943 |
| 2,445,520 | Francis et al. | July 20, 1948 |
| 2,456,723 | Beach | Dec. 21, 1948 |
| 2,518,677 | Garner et al. | Aug. 15, 1950 |
| 2,560,193 | Shoemaker | July 10, 1951 |

FOREIGN PATENTS

| Number | Country | Date |
|---|---|---|
| 17,339 of 1947 | Australia | Apr. 16, 1948 |

OTHER REFERENCES

Zimmerschied et al., Crystalline Adducts of Urea with Linear Aliphatic Compounds, presented before Amer. Chem. Soc., Sept. 18, 1949.

Angla, "Compte Rendu," vol. 224, pages 402–4 (1947).

Bengen, Ger. Pat. application B190,197, PB 1742, Bibliography of Scientific and Industrial Repts. (Office of the Publication Board), vol. 1, No. 4, page 101, Feb. 1, 1946. (Photostat available from TOM Reels 6 or 143 in Library of Congress.)